_(12)_ United States Patent
Yamaguchi et al.

(10) Patent No.: US 8,335,625 B2
(45) Date of Patent: Dec. 18, 2012

(54) SLIP CONTROL DEVICE AND METHOD FOR A VEHICLE

(75) Inventors: Ichiro Yamaguchi, Yokosuka (JP);
Yoshitaka Deguchi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1618 days.

(21) Appl. No.: 11/515,548

(22) Filed: Sep. 5, 2006

(65) Prior Publication Data
US 2007/0055433 A1    Mar. 8, 2007

(30) Foreign Application Priority Data

Sep. 6, 2005  (JP) ................................. 2005-257882

(51) Int. Cl.
*G05D 1/00* (2006.01)
*G06F 19/00* (2011.01)
(52) U.S. Cl. ................ 701/82; 701/70; 701/75; 701/83; 701/84; 701/85; 701/86; 701/87; 701/90; 701/92
(58) Field of Classification Search .................. 180/197, 180/249, 446; 701/41, 69–71, 80, 82
See application file for complete search history.

(56) References Cited

U.S. PATENT DOCUMENTS

| 5,519,617 | A | * | 5/1996 | Hughes et al. ................... | 701/84 |
| 6,005,358 | A | * | 12/1999 | Radev ............................ | 318/139 |
| 6,182,001 | B1 | * | 1/2001 | Sugai et al. ..................... | 701/78 |
| 6,236,926 | B1 | * | 5/2001 | Naitou ............................. | 701/70 |
| 6,473,683 | B1 | * | 10/2002 | Nada ............................... | 701/82 |
| 6,898,505 | B2 | * | 5/2005 | Kadota et al. .................... | 701/71 |
| 6,925,371 | B2 | * | 8/2005 | Yasui et al. ...................... | 701/72 |
| 6,952,635 | B2 | * | 10/2005 | Yasui et al. ...................... | 701/41 |
| RE39,183 | E | * | 7/2006 | Nada ............................... | 701/82 |
| 7,377,349 | B2 | * | 5/2008 | Hommi et al. ................ | 180/197 |
| 7,434,647 | B2 | * | 10/2008 | Sugo et al. .................... | 180/249 |
| 7,451,847 | B2 | * | 11/2008 | Hommi ......................... | 180/197 |
| 7,500,534 | B2 | * | 3/2009 | Hommi ......................... | 180/197 |
| 7,634,344 | B2 | * | 12/2009 | Masuda et al. .................. | 701/69 |
| 8,046,124 | B2 | * | 10/2011 | Muta et al. ...................... | 701/22 |
| 8,244,445 | B2 | * | 8/2012 | Luehrsen et al. ............... | 701/82 |
| 2001/0032046 | A1 | * | 10/2001 | Nada ............................... | 701/82 |
| 2001/0053953 | A1 | * | 12/2001 | Gong et al. ..................... | 701/70 |
| 2004/0016594 | A1 | * | 1/2004 | Yasui et al. ................... | 180/446 |
| 2004/0068358 | A1 | * | 4/2004 | Walenty et al. ................. | 701/71 |
| 2004/0073352 | A1 | * | 4/2004 | Bauerle et al. .................. | 701/82 |

(Continued)

FOREIGN PATENT DOCUMENTS

JP    2002-315106    10/2002
(Continued)

*Primary Examiner* — Ian Jen
(74) *Attorney, Agent, or Firm* — Young Basile (57) ABSTRACT

A method and apparatus for rapidly causing a slip of a driving wheel to converge regardless of the change in vehicle conditions when the driving wheel is in a slip state. When a slip occurs on a driving wheel, a second driving force command value is calculated from a driving force control value controlled by driving force control means and an angular acceleration. The second driving force command value is calculated so that torque capable of being transmitted to a road surface by the driving wheel takes the maximum value. Therefore, even if the friction coefficient of road surface or the wheel load changes, the driving torque of driving wheel can be commanded properly, so that the slip can be converged rapidly. The occurrence of slip at the time of re-acceleration after slip convergence can be avoided.

20 Claims, 9 Drawing Sheets

U.S. PATENT DOCUMENTS

| | | | |
|---|---|---|---|
| 2004/0098188 A1* | 5/2004 | Priemer et al. | 701/82 |
| 2005/0004741 A1* | 1/2005 | Shigeta et al. | 701/80 |
| 2005/0044944 A1* | 3/2005 | Kogure et al. | 73/146 |
| 2005/0080547 A1* | 4/2005 | Scelers et al. | 701/82 |
| 2005/0205346 A1* | 9/2005 | Aizawa et al. | 180/446 |
| 2005/0261111 A1* | 11/2005 | Kurogo et al. | 477/169 |
| 2005/0277515 A1* | 12/2005 | Tanaka | 477/156 |
| 2005/0278104 A1* | 12/2005 | Masuda et al. | 701/69 |
| 2005/0284679 A1* | 12/2005 | Hommi et al. | 180/197 |
| 2006/0037804 A1* | 2/2006 | Sugo et al. | 180/249 |
| 2006/0080023 A1* | 4/2006 | Hrovat et al. | 701/82 |
| 2006/0185914 A1* | 8/2006 | Hommi | 180/65.1 |
| 2006/0237244 A1* | 10/2006 | Hommi | 180/65.2 |
| 2007/0001510 A1* | 1/2007 | Miller | 303/149 |
| 2007/0016354 A1* | 1/2007 | Engel et al. | 701/80 |
| 2007/0192009 A1* | 8/2007 | Braeuchle et al. | 701/70 |

FOREIGN PATENT DOCUMENTS

| | | |
|---|---|---|
| JP | 2004-096824 | 3/2004 |
| JP | 2004-096825 | 3/2004 |
| JP | 2004-215499 | 7/2004 |

\* cited by examiner

SLIP CONTROL DEVICE AND METHOD FOR A VEHICLE

CROSS-REFERENCE TO RELATED APPLICATION

This application claims priority from Japanese Patent Application Serial No. 2005-257882 filed Sep. 6, 2005, which is incorporated herein in its entirety by reference.

TECHNICAL FIELD

The present invention relates in general to a technique for causing a slip of a driving wheel of a vehicle to converge in a slip control device for the vehicle.

BACKGROUND

In a known slip control device, a device that restricts torque sent from a motor to the driving wheel when the driving wheel revolves without making contact by means of a torque output from the motor has been proposed in Japanese Patent Provisional Publication No. 2004-96825. Accordingly, a slip control technique for restricting motor torque by referring to a map showing a relation such that the torque upper limit value decreases as the angular acceleration increases when the driving wheel revolves without making contact has been known.

In that slip control technique, the angular acceleration driving wheel is decreased by determining the torque upper limit value in advance in accordance with the angular acceleration of the driving wheel. Since the torque that can be transmitted to the road surface by the driving wheel is not considered, the maximum value of torque that can be transmitted to the road surface by the driving wheel cannot be made the torque upper limit value.

Therefore, when the vehicle is accelerated again after the slip has been caused to converge, another slip occurs. Alternatively, it is sometimes difficult to rapidly cause the slip to converge.

SUMMARY

Rapid convergence of a slip of a driving wheel regardless of the change in vehicle conditions when the driving wheel is in a slip state is desirable. According to teachings of the invention herein, a slip control device for a vehicle with a driving wheel includes a driving source for driving the driving wheel and a controller. The controller is operable to generate a new driving force control value for the driving source based on a driving force command value of a driving wheel. The controller is also operable to calculate a first driving force command value based on a request of a driver and a second driving force command value based on a current driving force control value and an angular acceleration of the driving wheel. Finally, the controller is operable to change over the driving force command value from the first driving force command value to the second driving force command value when the driving wheel is in a slip state.

Another slip control device for a vehicle having a driving wheel taught herein includes driving means for driving the driving wheel of the vehicle, driving force control means for generating a new driving force control value for driving the driving source based on a driving force command value of driving wheel, first driving force command value calculating means for calculating a first driving force command value based on a request of a driver, second driving force command value calculating means for calculating a second driving force command value based on a current driving force control value and the angular acceleration of driving wheel; and changeover means for changing over the driving force command value to the driving force control means from the first driving force command value to the second driving force command value when the driving wheel is in a slip state.

Inventive methods of controlling slip in a slip control device for vehicle including a driving wheel and a driving source for the driving wheel are also taught herein. One method includes generating a driving force control value operable to drive the driving source based on a driving force command value of the driving wheel, calculating a first driving force command value based on a request of a driver, calculating a second driving force command value based on the driving force control value and an angular acceleration of driving wheel and changing over the driving force command value from the first driving force command value to the second driving force command value when the driving wheel is in a slip state.

BRIEF DESCRIPTION OF DRAWINGS

The description herein makes reference to the accompanying drawings wherein like reference numerals refer to like parts throughout the several views, and wherein.

DETAILED DESCRIPTION

Figure 1:
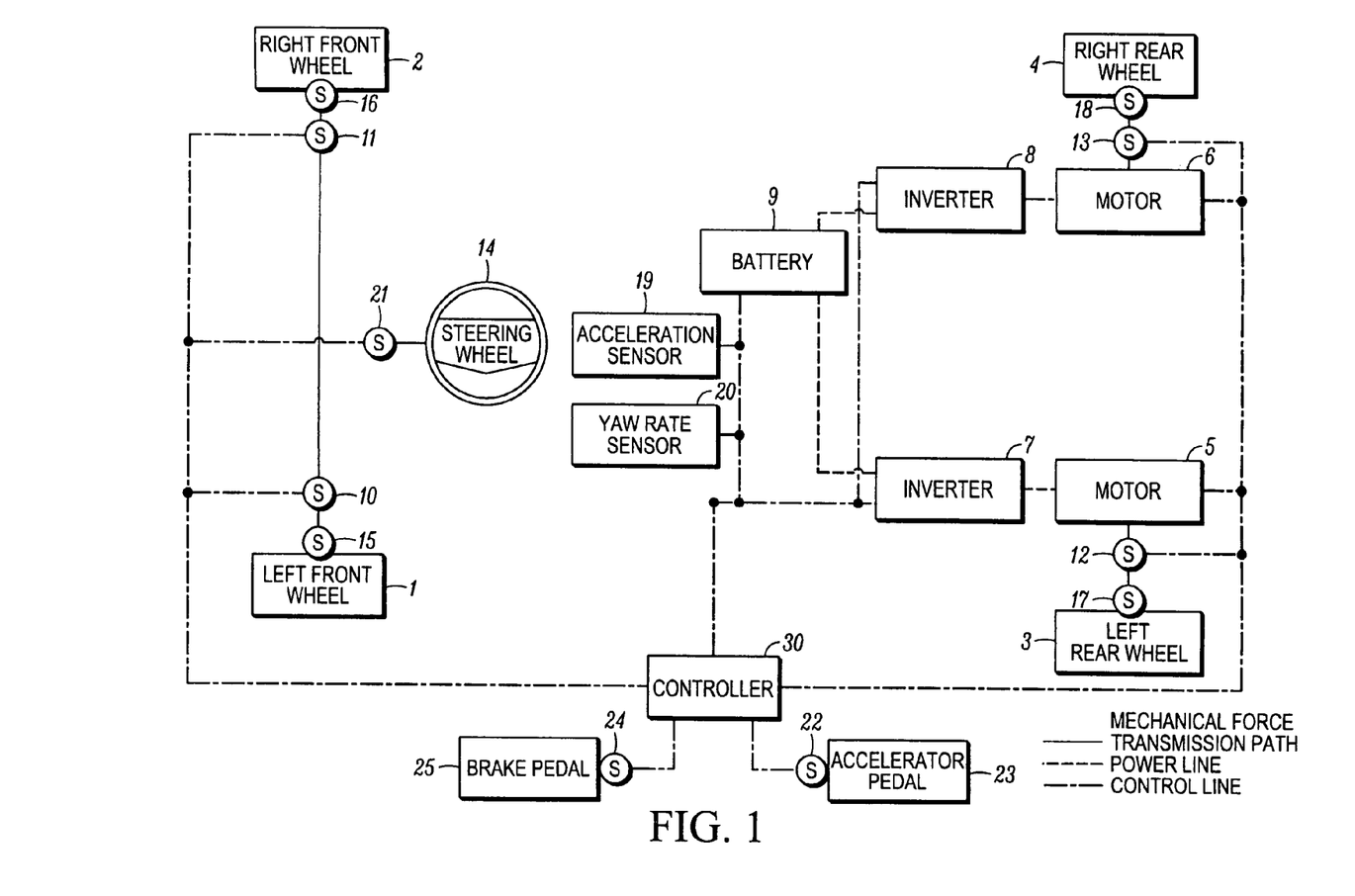
FIG. 1 is a schematic configuration diagram showing one embodiment of a slip control device for a vehicle.

Embodiments of the invention are now described in detail with reference to the accompanying drawings. FIG. 1 illustrates a system diagram of a slip control device for a vehicle in accordance with one embodiment. The vehicle of this embodiment is an electric vehicle that is run by driving rear wheels. Motors 5 and 6 are alternating current (AC) motors capable of power running and regenerative running, such as three-phase synchronous motors or three-phase induction motors. The motor 5 drives a left-hand side rear wheel 3, and the motor 6 drives a right-hand side rear wheel 4. Each of the motors 5 and 6 incorporates an electric current sensor so that the magnitude of the current flowing in the motor 5, 6 is sent to a controller 30.

Inverters 7 and 8 convert the direct current (DC) supplied from a battery 9 into an AC current and supply it to the motors 5 and 6, respectively. Inverters 7 and 8 also convert the AC current generated by the motors 5 and 6 into a DC current to charge the battery 9. The battery 9 is a nickel-hydrogen battery or a lithium-ion battery, for example.

Wheel speed sensors 10 to 13 detect rotational speeds ω1 to ω4 of wheels 1 to 4, respectively, and send the rotational speeds to the controller 30. The rotational radius of each of the wheels 1 to 4 is the same, being R. Rear wheels 3, 4 are connected to a respective motor 5, 6 at a speed reduction ratio of 1, that is, directly. Also, wheels 1 to 4 have the same tire properties. Specifically, in the case where the wheel load, the side slip angle, and the road surface friction coefficient are equal, the relationship between the driving force and the tire lateral force is the same.

The steering angles of the front wheels 1 and 2 are controlled by the operation of a steering wheel 14 performed by the driver. The steering angle change amount of the front wheel 1, 2 is set so as to be 1/16 with respect to the steering angle change amount of the steering wheel 14. Steering angle sensors 15 to 18 detect respective steering angles δ1 to δ4 of the wheels 1 to 4 and send the steering angles to the controller 30. Also, each of the wheels 1 to 4 is equipped with a mechanical brake, so that the brake can be applied according to a command from the controller 30.

An acceleration sensor 19, which can be installed at the gravity center position of the vehicle, detects a longitudinal acceleration αx and a transverse acceleration αy of vehicle. A yaw rate sensor 20 detects a yaw rate γ and sends it to the controller 30. Also, a steering angle sensor 21 detects a steering angle θ of the steering wheel 14 operated by the driver, an acceleration stroke sensor 22 detects a depression amount AP of an accelerator pedal 23, and a brake stroke sensor 24 detects a depression amount BP of a brake pedal 25. These sensors send the respective detected values to the controller 30. The controller 30 controls the torque of the motors 5 and 6 based on the received signals.

Next, the control carried out by the controller 30 is explained with reference to the flowchart of FIG. 2. This control is repeatedly carried out at each predetermined time (for example, 10 ms) by a central processing unit executing software stored in memory of the controller 30. The controller 30 can be an integrated microcontroller, for example.

In step S1 the rotational speeds ω1 to ω4 and steering angles δ1 to δ4 of the wheels 1 to 4, the longitudinal acceleration αx, the transverse acceleration αy, the yaw rate γ and the steering angle θ of the vehicle are read. The longitudinal acceleration αx of the vehicle is positive when the vehicle is accelerated to the front, the transverse acceleration αy is positive when the vehicle is directed from the vehicle gravity center position to the turning center at the time of a left turn, and the yaw rate γ is positive when the vehicle turns counterclockwise as viewed from the vertical upside.

In step S2 a vehicle speed V is calculated based on the rotational speeds ω1 to ω4 of the wheels 1 to 4. Speeds V1 to V4 of the wheels 1 to 4 can be calculated by multiplying the rotational speeds ω1 to ω4 of the wheels 1 to 4 by the wheel radius R. The vehicle speed V is calculated using the following formula (1) by using the speeds V1 and V2 of the front wheels 1 and 2. The speeds V1 to V4 are positive when the vehicle advances.

$$V = \frac{(V1 + V2)}{2} \quad (1)$$

In step S3 the controller 30 performs the function of calculating the slip amount. More specifically, slip amounts λ3, λ4 of the rear wheels 3, 4, which are the driving wheels, are calculated using the following formulas (2) and (3).

$$\lambda 3 = \frac{V3 - V}{V3}(V3 \geq V), \quad \lambda 3 = \frac{V3 - V}{V3}(V3 < V) \quad (2)$$

$$\lambda 4 = \frac{V4 - V}{V4}(V4 \geq V), \quad \lambda 4 = \frac{V4 - V}{V4}(V4 < V) \quad (3)$$

Figure 3:
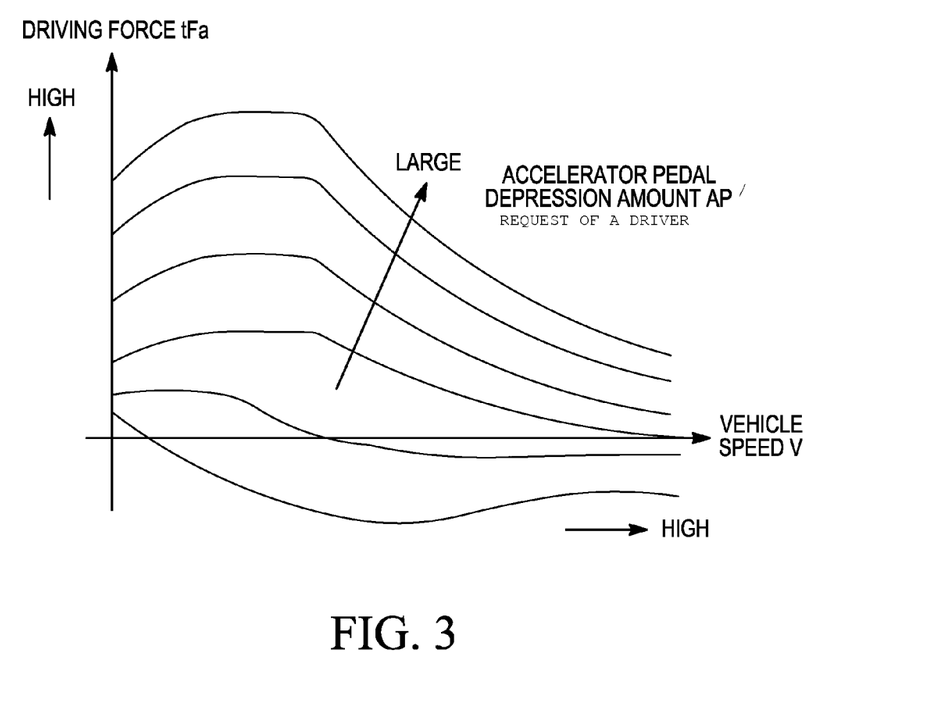
FIG. 3 is a graph showing the relationship between vehicle speed, driving force, and accelerator pedal depression.
Figure 4:
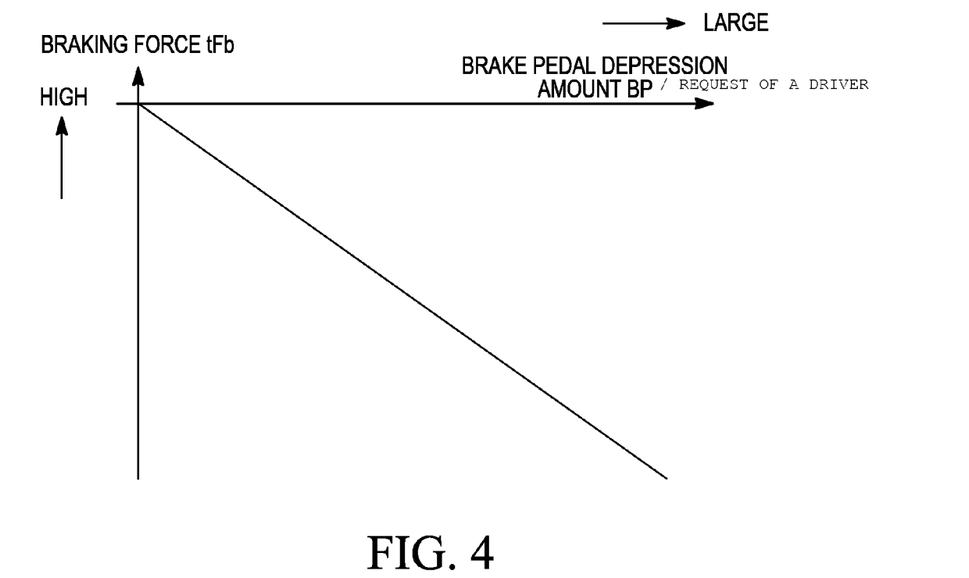
FIG. 4 is a graph showing the relationship between brake pedal depression and braking force.

In step S4 a target value tF of a force applied in the longitudinal direction of vehicle is calculated. The target value tF is calculated using the following formula (4):

$$tF = tFa + tFb; \quad (4)$$

wherein tFa is a driving force calculated by referring to FIG. 3 based on the depression amount AP of the accelerator pedal 23 and the vehicle speed V; and tFb is a braking force calculated by referring to FIG. 4 based on the depression amount BP of the brake pedal 25. The values tF, tFa and tFb are positive when the vehicle is accelerated to the front.

Figure 5:
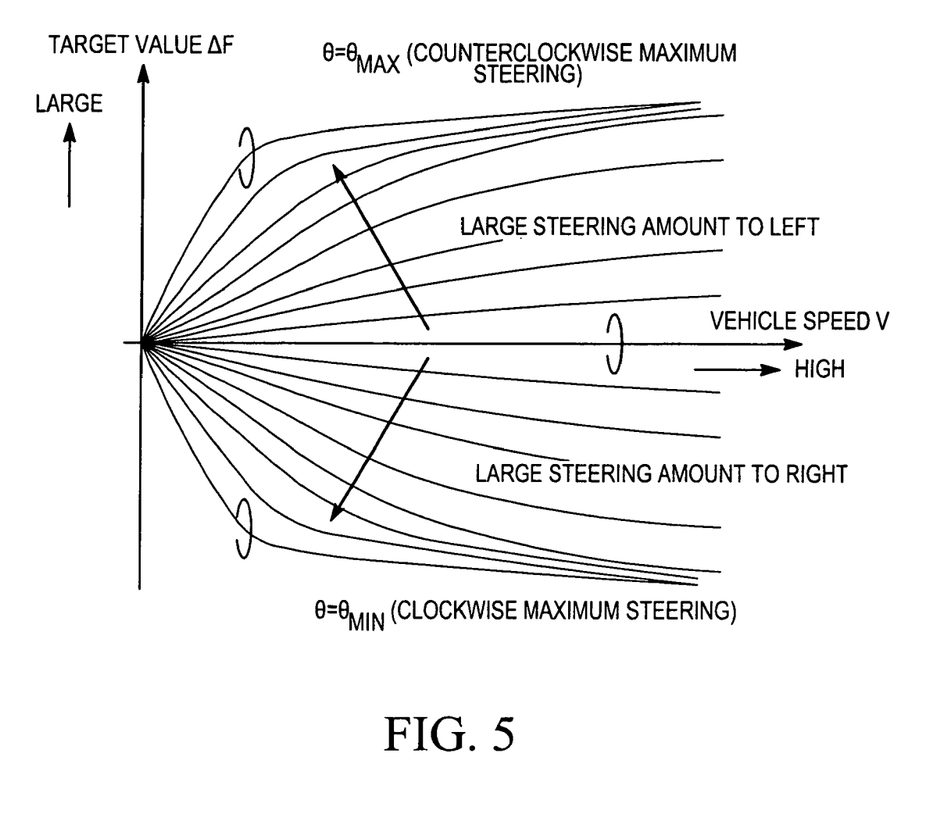
FIG. 5 is a graph showing the relationship between the target value $\Delta F$ of a difference in driving force between left and right driving wheels, the vehicle speed, and the steering angle $\theta$ of a steering wheel.

In step S5 a target value ΔF of a driving force difference between the left and right driving wheels 3 and 4 is calculated. The steering wheel target value ΔF is calculated by referring the relationship shown in FIG. 5 between the vehicle speed V and the steering angle θ of the steering wheel 14.

In step S6, the controller 30 performs the function of calculating a required driving force, also called herein a first driving force command value. That is, first driving force command values Fx3 and Fx4 of the rear wheels 3 and 4 based on the driver's request are calculated using the following formulas (5) and (6). The first driving force command values Fx3 and Fx4 are positive when the force acts in the direction such that the vehicle is advanced.

$$Fx3 = \frac{tF}{2} - \frac{\Delta F}{2} \quad (5)$$

$$Fx4 = \frac{tF}{2} + \frac{\Delta F}{2} \quad (6)$$

In step S7, the controller 30 performs the function of calculating a-a driving force basic value, also called herein a second driving force command value. The second driving force command values Ff3 and Ff4, which are driving forces corresponding to the road surface reaction force, are calculated using the following formulas (7) and (8):

$$Ff3 = \frac{Tm5 - Ir \cdot \frac{d\omega 3}{dt}}{R}; \text{ and} \quad (7)$$

$$Ff4 = \frac{Tm6 - Ir \cdot \frac{d\omega 4}{dt}}{R} \quad (8)$$

wherein Tm5 and Tm6 are torque of the motors 5 and 6, respectively, and are calculated based on the detection values of the electric current sensors incorporated in the motors 5 and 6. The value Ir is inertia of the rear driving wheel. Also, $d\omega3/dt$ and $d\omega4/dt$ are differential values of the rotational speeds $\omega3$ and $\omega4$ of the rear wheels 3 and 4, respectively.

The values $d\omega3/dt$ and $d\omega4/dt$ are calculated using the following formulas (9) and (10):

$$\frac{d\omega3}{dt} = \frac{\omega3 - \omega3(k-1)}{Tsamp}; \text{ and} \tag{9}$$

$$\frac{d\omega4}{dt} = \frac{\omega4 - \omega4(k-1)}{Tsamp}; \tag{10}$$

wherein $\omega3(k-1)$ and $\omega4(k-1)$ are rotational speeds $\omega3$ and $\omega4$ at the time of the preceding processing. Tsamp is the calculation period.

Thus, the driving force capable of being transmitted to the road surface without the occurrence of vehicle slip (corresponding to the road surface reaction force) is determined from the relationship between the current motor torque (i.e., the current driving force control value) of the vehicle calculated based on the detection values of the electric current sensors incorporated in the motors 5 and 6 and the angular acceleration of the rear wheel. Therefore, a proper driving force command value corresponding to a change in vehicle conditions (changes of wheel load and road surface friction) can be generated. Also, the second driving force command values Ff3 and Ff4 can be determined by calculation as described, not necessarily by a map lookup. Therefore, the ROM of the controller 30 can be kept small, reducing manufacturing cost.

In step S8 the controller 30 starts a correction function. Driving force correction amounts Fb3 and Fb4, which are the correction amounts of driving forces of the driving wheels 3 and 4 for causing the slip amounts $\lambda3$ and $\lambda4$ of the rear wheels 3 and 4 to converge on a target slip amount $\lambda'$, are calculated using formulas (11) and (12) below. The target slip amount $\lambda'$ is based on the slip amounts $\lambda3$ and $\lambda4$ at the time when the road surface reaction force is the maximum, namely the slip amounts $\lambda3$ and $\lambda4$ at the time when the frictional force between the driving wheels 3 and 4 and the road surface is the maximum.

$$Fb3=P\times(\lambda'-\lambda3) \tag{11}$$

$$Fb4=P\times(\lambda'-\lambda4) \tag{12}$$

In formulas (11) and (12), P is a gain that can be, for example, 20. By example, the target slip amount $\lambda'$ is set at 0.15. Also, the driving force correction amounts Fb3 and Fb4 may be calculated by using sliding mode control, PID control, PI control, or the like.

In step S9, after the calculation of step S8 second driving force command values Fs3 and Fs4 are corrected using the following formulas (13) and (14).

$$Fs3=Ff3+Fb3 \tag{13}$$

$$Fs4=Ff4+Fb4 \tag{14}$$

In step S10 a changeover function occurs. More specifically, the first driving force command values Fx3 and Fx4 are compared with the second driving force command values Fs3 and Fs4 after correction, and the smaller values are set so as to be control driving forces F3 and F4. The reason for this is described hereinafter. When no slip occurs on the driving wheel of vehicle, the second driving force command values Fs3 and Fs4 after correction are calculated so as to be always larger than the first driving force command values Fx3 and Fx4. Therefore, when no slip occurs on the driving wheels of a vehicle, the first driving force command values Fx3 and Fx4 are selected as the control driving forces F3 and F4. On the other hand, when a slip occurs on the driving wheels of the vehicle, the second driving force command values Fs3 and Fs4 after correction are calculated so as to be always smaller than the first driving force command values Fx3 and Fx4. Therefore, when a slip occurs on the driving wheels of the vehicle, the second driving force command values Fs3 and Fs4 after correction are selected as the control driving forces F3 and F4. Also, in the case where the driver recognizes the occurrence of a slip and releases the accelerator pedal, the first driving force command values Fx3 and Fx4 decrease, so that the first driving force command values Fx3 and Fx4 are selected. Hence, the driver's operation can be followed quickly.

The configuration may be such that only when the driving wheels are judged to be in a slip state, the second driving force command values Fs3 and Fs4 after correction are set so as to be the control driving forces F3 and F4. In this case, when the slip amounts $\lambda3$ and $\lambda4$ exceed, for example, the target slip amount $\lambda'$ the driving wheels 3 and 4 can be judged to be in a slip state. Also, the configuration may be such that the second driving force command values after correction are also calculated only when the driving wheels are judged to be in a slip state.

In step S11 the controller performs the function of driving force control. That is, the outputs of the motors 5 and 6 are controlled based on a torque command value (i.e., a driving force control value) obtained by multiplying the control driving forces F3 and F4 by the radius R of wheel.

Figure 6:
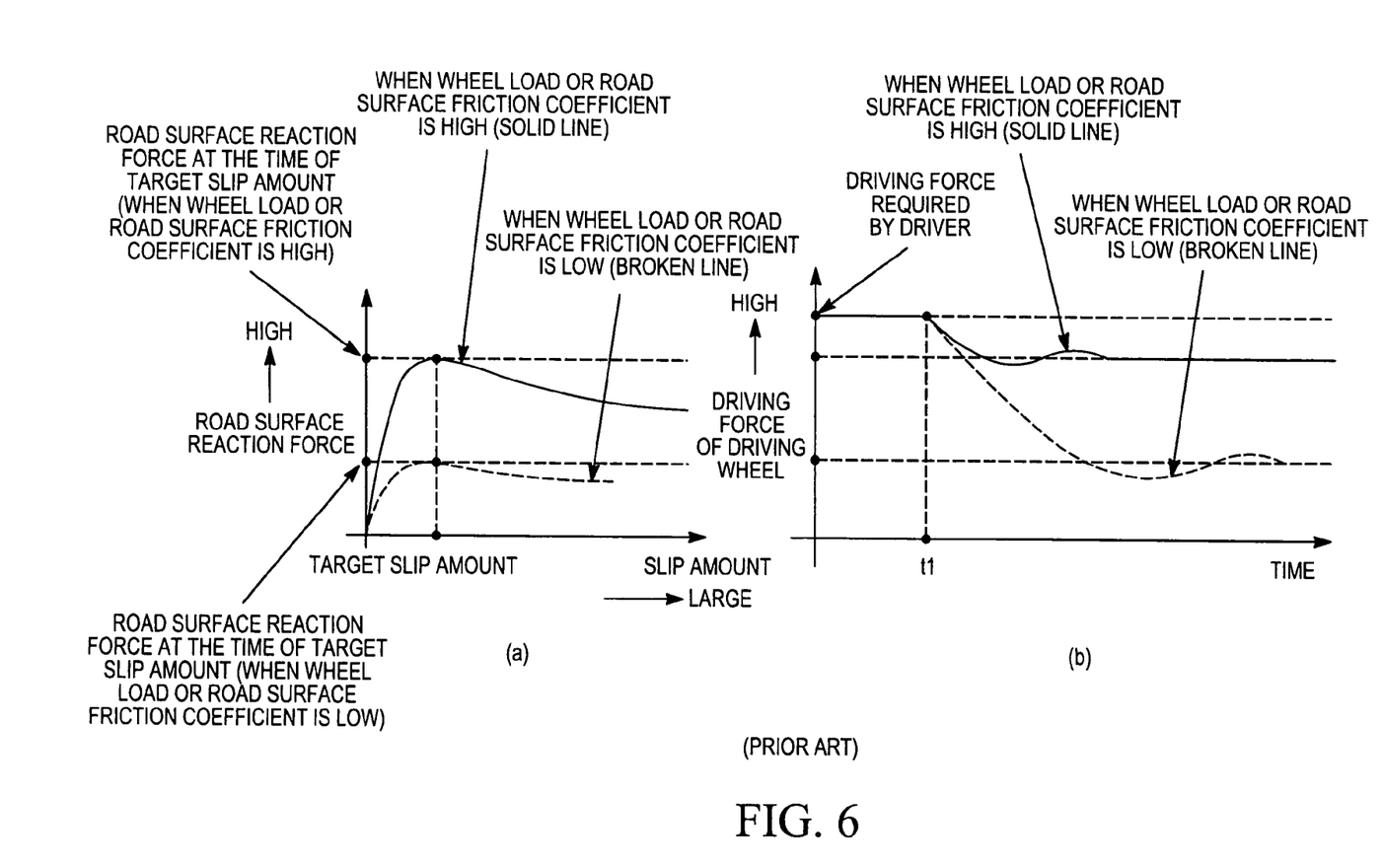
FIG. 6 illustrates slip control of a vehicle in a conventional example.
Figure 7:
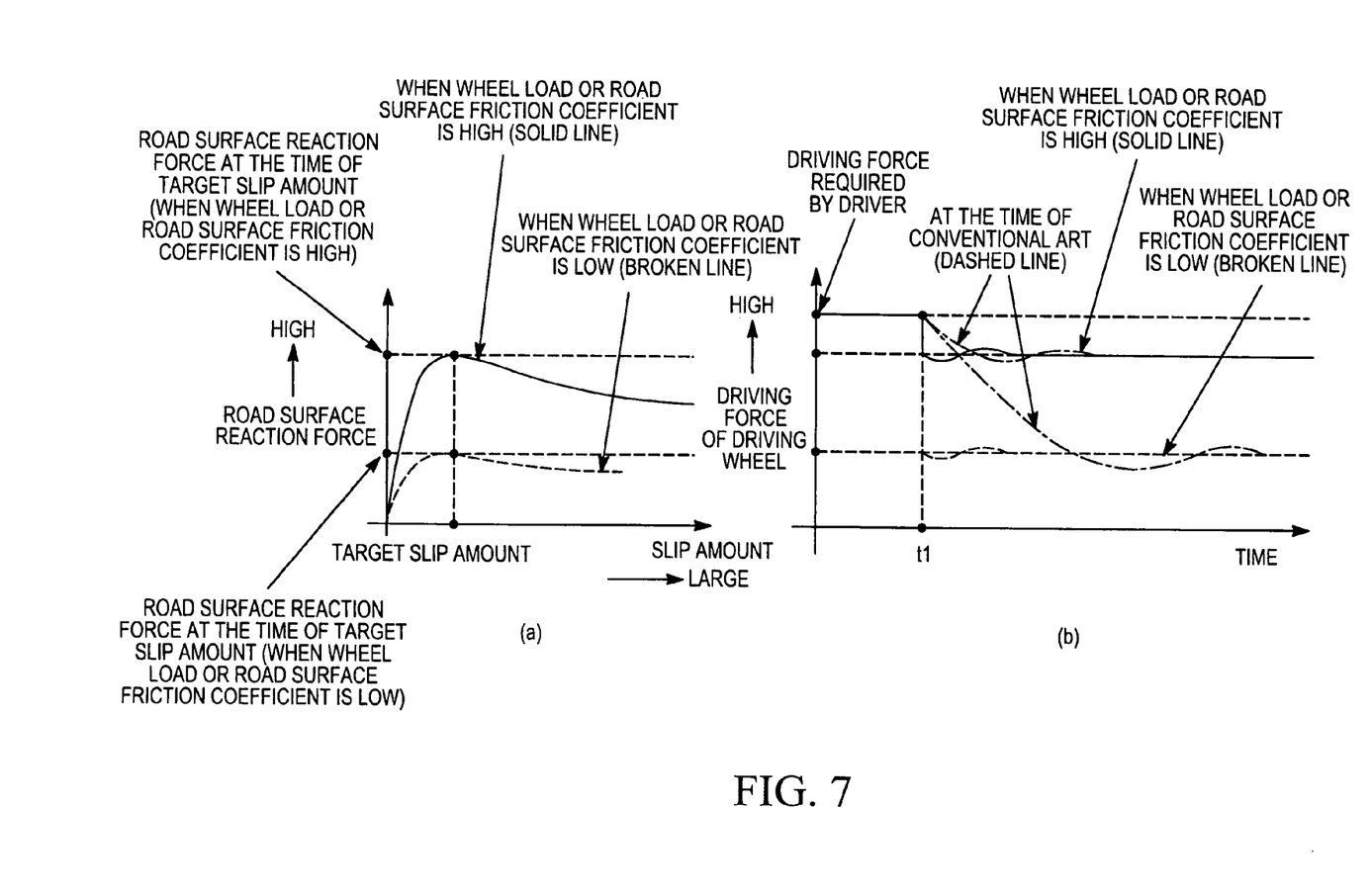
FIG. 7 illustrates slip control of a vehicle according to the teachings herein.

Summarizing the above-described control, the operation of this embodiment is explained with reference to FIGS. 6 and 7. FIG. 6 illustrates the slip control of vehicle based on slip amount control, and FIG. 7 illustrates the slip control of vehicle according to the described embodiment. In both of these figures, diagram (a) illustrates a relationship between the slip amount and the road surface reaction force, and timing chart (b) shows a change in driving force of the driving wheel.

First, a conventional example is explained with reference to FIG. 6. When a driving wheel 3, 4 becomes in a slip state at time t1, the driving force of the driving wheel 3, 4 is controlled based on the difference between the slip amount $\lambda3$, $\lambda4$ and the target slip amount $\lambda'$ so that the slip amount $\lambda3$, $\lambda4$ of the driving wheel 3, 4 is caused to converge on the target slip amount $\lambda'$. Thereby, the driving force is decreased from the required driving force Fx3, Fx4, becoming equal to the road surface reaction force at the target slip amount $\lambda'$ so that the slip state of the driving wheel 3, 4 is eliminated.

However, when the wheel load is low due to the road surface conditions and the vehicle conditions or otherwise, the road surface reaction force at the target slip amount $\lambda'$ is lower than that in the case where the wheel load is high. Consequently, the discrepancy between the driving force at time t1 and the road surface reaction force at the target slip amount $\lambda'$ becomes large, and the time required for causing the driving force of the driving wheel 3, 4 to converge on the road surface reaction force at the target slip amount $\lambda'$ increases.

Next, the described embodiment is explained with reference to FIG. 7. In this case, when the driving wheel 3, 4 becomes in a slip state at time t1 the sum of the second driving force command value Ff3, Ff4 calculated based on the motor angular acceleration ω3, ω4 and the driving force correction amount Fb3, Fb4 calculated based on the difference between the slip amount λ3, λ4 and the target slip amount λ' is made the driving force F3, F4 of the driving wheel 3, 4 so that the slip amount λ3, λ4 of the driving wheel 3, 4 is caused to converge on the target slip amount λ'.

That is, when the slip state is formed, the driving force of the driving wheel 3, 4 is changed over from the first driving force command value Fx3, Fx4 to the second driving force command value Fs3, Fs4 after correction, and the driving force is caused to converge on the road surface reaction force at the target slip amount λ' by the second driving force command value Fs3, Fs4 after correction. Since the second driving force command value Ff3, Ff4 is set so as to be small as the acceleration increases, the driving force converges rapidly on the road surface reaction force even in the case where wheel load W3, W4 is low and the discrepancy between the driving force and the road surface reaction force at the target slip amount λ' is large. Further, since the second driving force command value Ff3, Ff4 is required to take a value corresponding to the road surface reaction force, the torque takes a value proper not only to cause the slip to converge but also to advance the vehicle after the slip has converged. Therefore, a slip can be prevented from occurring again after the slip has converged.

As described above, in this embodiment the second driving force command value Fs3, Fs4 after correction is set at the road surface reaction force at the target slip amount λ'. Also, the driving force of the driving wheel 3, 4 is controlled based on the difference between slip amount λ3, λ4 and the target slip amount λ' with the second driving force command value Ff3, Ff4 being the reference. Even when the discrepancy between the driving force at the time when the driving wheel 3, 4 becomes in a slip state and the road surface reaction force at the target slip amount λ' is large, the slip amount λ3, λ4 can be caused to converge rapidly on the target slip amount λ'. For this reason, the slip state of the wheel 3, 4 is eliminated rapidly, by which the deterioration in drivability and fuel economy can be prevented.

Further, since the second driving force command values Ff3 and Ff4 are calculated based on the torque Tm5, Tm6 of the motors 5 and 6 and the rotational speeds ω3 and ω4 of the rear wheels 3 and 4, even if a change in driving conditions, a change in vehicle weight, a time change in tire rubber, or a physical change such as a tire change takes place, there is no need for rewriting the programs and parameters of an onboard computer. Maintenance is accordingly reduced.

In a second embodiment, a part of the calculating method for the second driving force command value differs from the calculating method in the first embodiment. Next, the calculating method for the second driving force command values Ff3 and Ff4 in this second embodiment is explained.

In this embodiment the values obtained by subjecting the second driving force command values Ff3 and Ff4 of the rear wheels 3 and 4 to first-order lag filtering are made the second driving force command values Ff3 and Ff4. The first-order lag filtering is performed using the following formulas (15) and (16) in which a first-order lag transfer function is made discrete:

$$Ff3 = \frac{Tsamp \times Ff3 + Ts \times Ff3(k-1)}{Ts + Tsamp}; \text{ and} \quad (15)$$

$$Ff4 = \frac{Tsamp \times Ff4 + Ts \times Ff4(k-1)}{Ts + Tsamp}; \quad (16)$$

wherein Ts is a first-order lag time constant set at 1.0, for example.

Figure 8:
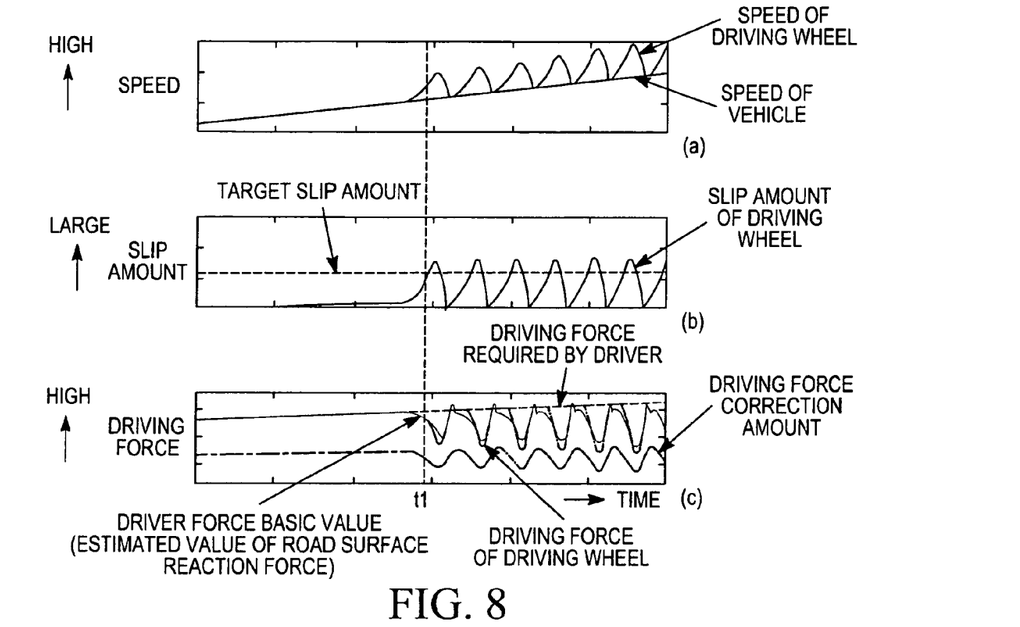
FIG. 8 includes timing charts showing driving conditions of a vehicle in the case where a road surface reaction is made a driving force basic value.
Figure 9:
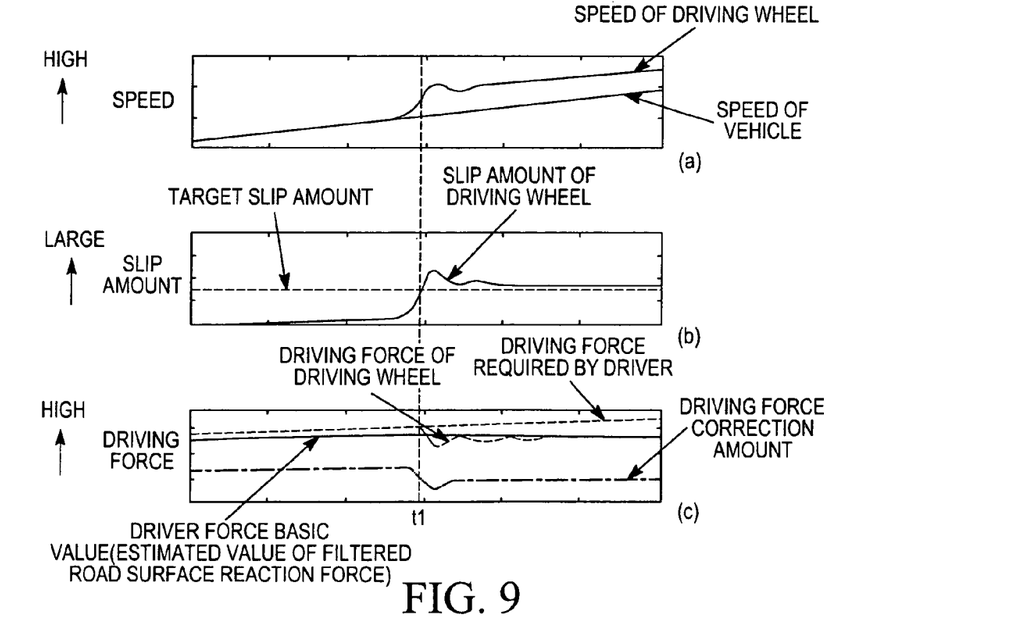
FIG. 9 includes timing charts showing driving conditions of a vehicle in the case where a value obtained by subjecting a road surface reaction force to first-order lag filtering is made a driving force basic value.

The operation of this second embodiment is explained with reference to FIGS. 8 and 9. FIG. 8 includes timing charts showing the driving conditions of a vehicle in the case where the road surface reaction force is made a driving force basic value. FIG. 9 includes timing charts showing the driving conditions of a vehicle in the case where a value obtained by subjecting the second driving force command value to first-order lag filtering is made the driving force basic value. In both of the figures, chart (a) indicates vehicle speed, chart (b) indicates wheel slip amount, and chart (c) indicates driving force.

First, the case where the second driving force command value Ff3, Ff4 is not subjected to lag filtering is explained with reference to FIG. 8. During the running on a road surface with a low road surface friction coefficient, the driving force of the driving wheel 3, 4 increases gradually. At time t1 the slip amount λ3, λ4 of the driving wheel 3, 4 increases, by which a slip state is formed. With increasing slip amount λ3, λ4, the road surface reaction force calculated based on the torque Tm5, Tm6 of the motor 5, 6 and the rotational speed ω1, ω4, namely, the second driving force command value Ff3, Ff4, decreases. Subsequently, the increase in the slip amount is restrained by the decrease in the second driving force command value Ff3, Ff4, by which the slip amount begins to decrease.

Herein, in the case where the driving force correction amount Fb3, Fb4 calculated based on the difference between the target slip amount λ' and the slip amount λ3, λ4 and the second driving force command value Ff3, Ff4 overshoot with respect to the target slip amount and the driving force corresponding to the road surface reaction force by means of disturbance or communication delay, not only the driving force correction amount Fb3, Fb4 but also the second driving force command value Ff3, Ff4 is corrected. In this case, since both are corrected for the overshoot, the corrections for the second driving force command value and the target slip amount are made at almost the same frequency. Thus the oscillation of the target driving force Fs3, Fs4, which is the sum of the both, is promoted. Thereby, the driving force of the driving wheel 3, 4 is subjected to hunting, so that the slip amount λ' of the driving wheel 3, 4 cannot be caused to converge rapidly on the target slip amount λ3, λ4.

Next, the case where a value obtained by subjecting the second driving force command value Ff3, Ff4 to first-order lag filtering is used is explained with reference to FIG. 9. During the running on a road surface with a low road surface friction coefficient, the driving force of the driving wheel 3, 4 increases gradually. At time t1 the slip amount λ3, λ4 of the driving wheel 3, 4 increases, by which a slip state is formed. With increasing slip amount λ3, λ4, the second driving force command value Ff3, Ff4 decreases. Subsequently, the increase in the slip amount λ3, λ4 is restrained by the decrease in the second driving force command value Ff3, Ff4, by which the slip amount λ3, λ4 begins to decrease.

Even in the case where the driving force correction amount Fb3, Fb4 calculated based on the difference between the target slip amount λ' and the slip amount λ3, λ4 and the second driving force command value Ff3, Ff4 overshoot with respect to the target slip amount and the driving force corresponding to the road surface reaction force by means of disturbance or communication delay, regarding the driving force corresponding to the road surface reaction force, the value obtained by subjecting the second driving force command value Ff3, Ff4 to first-order lag filtering is used. Therefore, regarding the driving force corresponding to the road surface reaction force, the correction for overshoot is not made at least at this time. On the other hand, regarding the driving force correction amount Fb3, Fb4, no delay correction is made for the difference between the target slip amount $\lambda'$ and the slip amount $\lambda 3$, $\lambda 4$. Therefore, the correction timing of both becomes asynchronous, and the oscillation of the driving force basic value Ff3, Ff4 is restrained. Thereby, the driving force of the driving wheel 3, 4 converges on the second driving force command value Ff3, Ff4 without hunting. Also, the slip amount approaches the target slip amount gradually, and thereby the oscillation of the second driving force command value is also restrained so that the oscillation of the driving force basic value is further restrained. Therefore, the slip amount $\lambda 3$, $\lambda 4$ of the wheel 3, 4 converges rapidly on the target slip amount $\lambda'$.

As described above, in this second embodiment, since the value obtained by subjecting the second driving force command value Ff3, Ff4 to first-order lag filtering is used as the driving force basic value Ff3, Ff4, the driving force of the driving wheel 3, 4 can be prevented from becoming oscillatory due to the fact that the driving force correction amount Fb3, Fb4 is made oscillatory by disturbance or communication delay. Therefore, the slip amount $\lambda 3$, $\lambda 4$ of the wheel 3, 4 can converge rapidly on the target slip amount $\lambda'$, and hence the slip state of the wheel 3, 4 is eliminated rapidly, preventing the deterioration in drivability and fuel economy.

In a third embodiment, the first-order lag filtering explained in the second embodiment is cut. Other control procedures are the same as those in the second embodiment. Hereinafter, the calculating method for the second driving force command value Ff3, Ff4 in this embodiment is explained with reference to FIG. 10, which is a flowchart showing the arithmetic control of the second driving force command value Ff3, Ff4.

Figure 10:
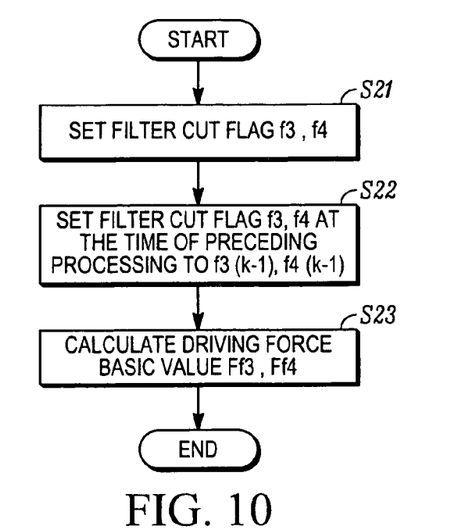
FIG. 10 is a flowchart showing arithmetic control of a driving force basic value Fx3, Fx4 in an embodiment of a slip control device for a vehicle.

In step S21 filter cut flags f3 and f4 are set to 1 if the slip amounts $\lambda 3$ and $\lambda 4$ of the rear wheels 3 and 4 are larger than a filter cut threshold value $\lambda$th and are set to 0 if they are smaller than the threshold value $\lambda$th. The filter cut threshold value $\lambda$th is a threshold value for judging whether or not the first-order lag filtering must be cut temporarily, and, in this embodiment, it takes the same value as the target slip amount $\lambda'$.

In step S22 the filter cut flags f3 and f4 in the preceding processing are set to f3($k$−1) and f4($k$−1). In the next step, step S23, the driving force basic values, or second driving force command values, Ff3 and Ff4 are calculated. The calculating method for the second driving force command value Ff3 of the left rear wheel 3 is explained hereinafter. For the right rear wheel 4, the second driving force command value Ff4 is calculated in the same way as that of the left rear wheel 3.

In the case where a value obtained by subtracting the filter cut flag f3($k$−1) at the time of preceding processing from the filter cut flag f3 is 1, the first-order lag filtering of the second driving force command value Ff3 is inhibited, namely, the first-order lag filter is cut, and the second driving force command value is generated.

In contrast, in the case where the value obtained by subtracting the filter cut flag f3($k$−1) at the time of preceding processing from the initial value setting flag f3 is not 1, a value obtained by multiplying the second driving force command value Ff3 by the first-order lag filter is made the second driving force command value Ff3.

Figure 11:
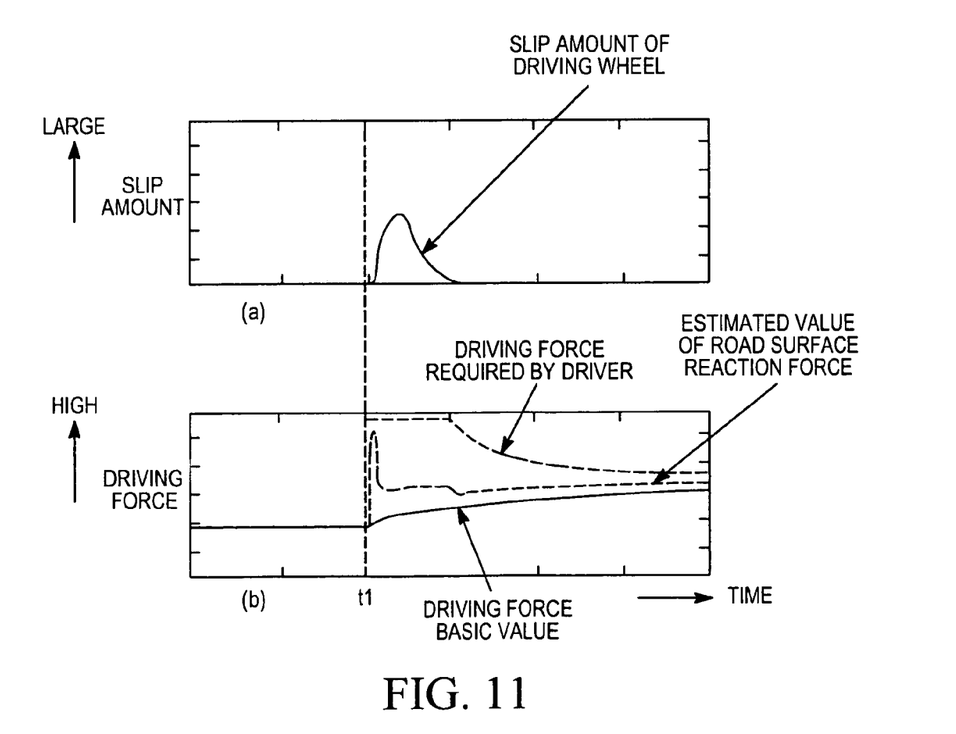
FIG. 11 includes timing charts showing driving conditions of a vehicle in the case where a first-order lag filter is not cut.
Figure 12:
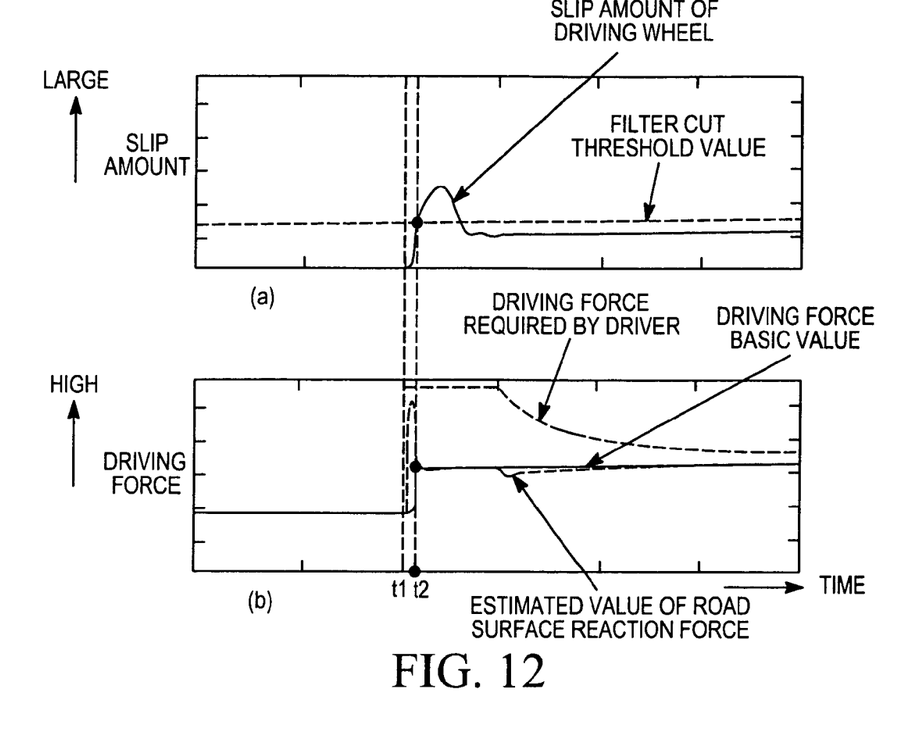
FIG. 12 includes timing charts showing driving conditions of a vehicle in the case where a first-order lag filter is cut.

Summarizing the above-described control, the operation of this third embodiment is explained with reference to FIGS. 11 and 12. FIG. 11 shows the driving conditions of a vehicle in the case where the first-order lag filter is not cut. FIG. 12 shows the driving conditions of a vehicle in the case where the first-order lag filter is cut. In both of the figures, time chart (a) indicates wheel slip amount, and time chart (b) indicates driving force.

First, the case where the first-order lag filter is not cut is explained with reference to FIG. 11. At time t1, if the first driving force command value Fx3, Fx4, which is a driving force required by the driver, increases during the running of vehicle, the torque of the motor 5, 6 increases, so that the calculated second driving force command value Ff3, Ff4 increases. Accordingly, the slip amount $\lambda 3$, $\lambda 4$ of the driving wheel 3, 4 increases. At this time, since the value obtained by subjecting the second driving force command value Ff3, Ff4 to first-order lag filtering is set to the second driving force command value Ff3, Ff4, the second driving force command value Ff3, Ff4 rises gradually, and time is required before the discrepancy between the second driving force command value Ff3, Ff4 and the driving force corresponding to the road surface reaction force decreases.

Next, the case where the first-order lag filter is not cut is explained with reference to FIG. 12. At time t1, if the first driving force command value Fx3, Fx4 of the driver increases during the running of vehicle, the torque of the motor 5, 6 increases. Hence, the calculated second driving force command value Ff3, Ff4 increases, and the slip amount $\lambda 3$, $\lambda 4$ of the driving wheel 3, 4 increases. At this time, since the value obtained by subjecting the second driving force command value Ff3, Ff4 to first-order lag filtering is set to the second driving force command value Ff3, Ff4, the second driving force command value rises gradually. Immediately after that, when the slip amount exceeds the filter cut threshold value at time t2, the first-order lag filter is cut temporarily so that the second driving force command value Ff3, Ff4 rises stepwise. Therefore, the second driving force command value Ff3, Ff4 quickly follows the driving force of a suddenly-changed road surface reaction force. Subsequently, the second driving force command value Ff3, Ff4 takes a value obtained by undergoing first-order lag filtering.

In this embodiment, when the slip amount $\lambda 3$, $\lambda 4$ exceeds the filter cut threshold value $\lambda$th, which is, for example, the target slip amount $\lambda'$, the first-order lag filter is cut temporarily, and the second driving force command value Ff3, Ff4 is calculated so that after the driving force required by the driver has increased suddenly, the second driving force command value Ff3, Ff4 converges rapidly on the driving force corresponding to the road surface reaction force. Therefore, the response of the driving force with respect to a change in the driving force Fx3, Fx4 required by the driver is improved, so that the drivability of vehicle can be improved.

Figure 2:
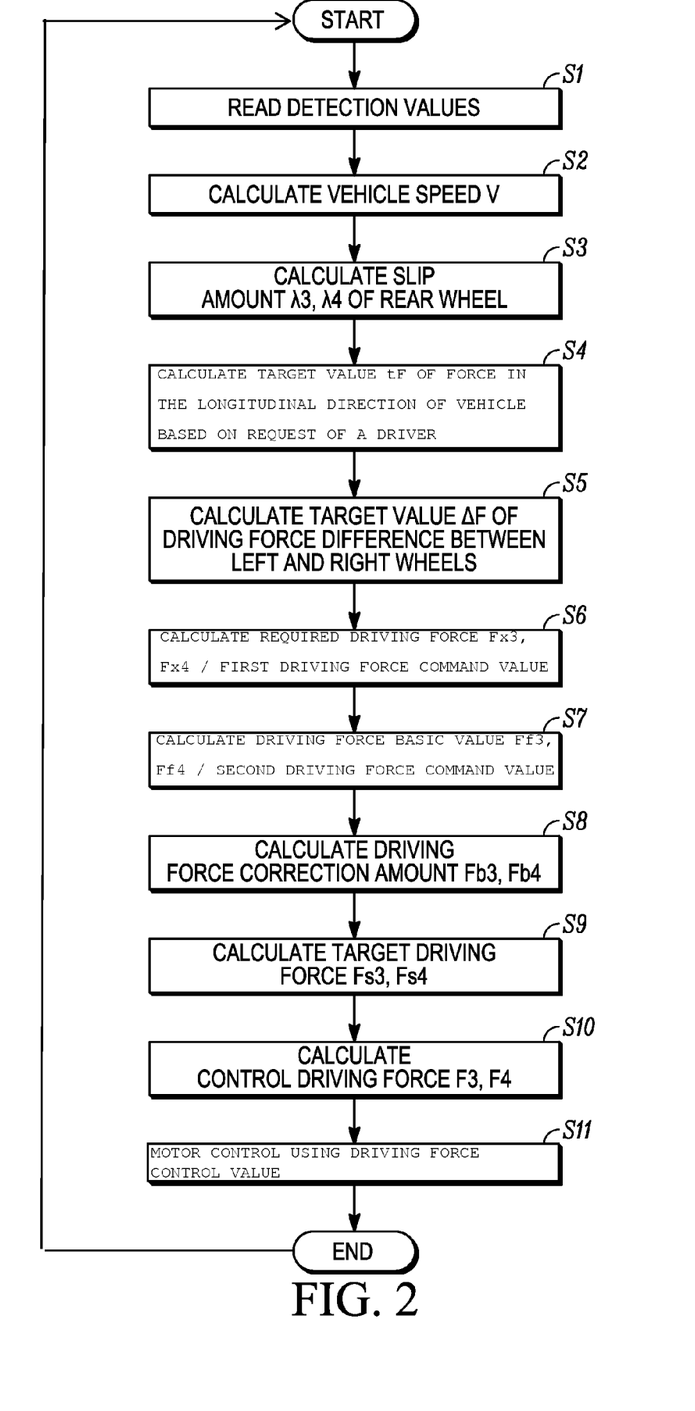
FIG. 2 is a flowchart showing control of a slip control device in accordance with teachings herein.

In a fourth embodiment, the calculating method for the control driving forces F3 and F4 in step S10 in the control shown in the flowchart of FIG. 2 differs from that in the first to third embodiments. Other configurations and control procedures are the same. Hereinafter, the calculating method for the control driving forces F3 and F4 in this embodiment is explained with reference to FIG. 13, which is a flowchart showing the arithmetic control of the control driving forces F3 and F4.

Figure 13:
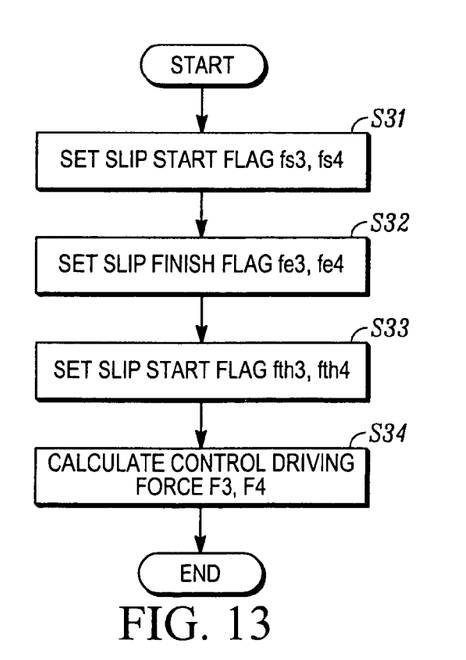
FIG. 13 is a flowchart showing arithmetic control of a control driving force F3, F4 in an embodiment of a slip control device for a vehicle.

In step S31 slip start flags fs3 and fs4 are set to 1 if the slip amounts $\lambda 3$ and $\lambda 4$ of the rear wheels 3 and 4 are larger than a slip start threshold value $\lambda$ths and are set to 0 if the slip amounts are not larger than the slip start threshold value λths. The slip start threshold value λths is set, for example, to the target slip amount λ'.

In step S32 slip finish flags fe3 and fe4 are set to 1 if the slip amounts λ3 and λ4 of the rear wheels 3 and 4 are smaller than a slip finish threshold value λthe, and the flags fe3 and fe4 are set to 0 if the slip amounts are not smaller than the slip finish threshold value λthe. The slip finish threshold value λthe is set, for example, to a value obtained by subtracting 0.05 from the target slip amount λ'. Where the target slip amount λ' is, for example, 0.15, the slip threshold value λthe is 0.15−0.05=0.1.

In step S33 slip flags fth3 and fth4 are set to 1 if the slip start flags fths3 and fths4 are 1, and slip flags fth3 and fth4 are set to 0 if the slip finish flags fe3 and fe4 are 1. If the slip start flags fths3 and fths4 and the slip finish flags fe3 and fe4 are 0, the slip flags fth3 and fth4 are not changed. The slip flags fth3 and fth4 are set to 0 as their initial values.

In step S34 the control driving forces F3 and F4 are calculated. If the slip flags fth3 and fth4 are 0, the first driving force command values Fx3 and Fx4 calculated in step S6 in FIG. 2 are made the control driving forces F3 and F4. Alternatively, if the slip flags fth3 and fth4 are 1, the second driving force command values Fs3 and Fs4 after correction are made the control driving forces F3 and F4.

In this fourth embodiment, in addition to the judgment whether or not the wheels 3 and 4 are in a slip state, which is made on the basis of the slip amounts λ3 and λ4, the slip start threshold value λths for judging that the wheels 3 and 4 become in a slip state and the slip start threshold value λthe for judging that the wheels 3 and 4 become in a non-slip state take a different value, so that the occurrence of hunting at the time when the control driving forces F3 and F4 are changed over between the first driving force command values Fx3 and Fx4 and the second driving force command values Fs3 and Fs4 after correction can be prevented. Therefore, the driving forces of the driving wheels 3 and 4 converge rapidly so that the drivability and fuel economy of vehicle can be improved.

Various modifications and changes can be made within the scope of the technical concepts of the invention. For example, in the above-described embodiments the explanation has been given by using a vehicle in which only the rear wheels 3 and 4 are driven. A vehicle in which four wheels are driven independently may be used, however. In this case, the vehicle speed V is calculated as the mean values of the four wheels, and the control is also carried out for the front wheels 1 and 2.

Also, although the vehicle speed V is detected by using a wheel speed sensor 9 in the above-described embodiments, the vehicle speed V may be detected by using a GPS navigation system.

Although described with reference to an electric vehicle with motors 5, 6 with their associated inverters 7, 8 as driving sources for the wheels, the invention could be implemented with an internal combustion engine as the driving source. Further, the teachings herein can also be applied to a vehicle in which the wheels are connected directly and are driven by one motor or one engine, or a vehicle in which the left and right wheels are driven by a driving system combining the motor and the engine. In this case, the control has only to be carried out by regarding the left and right wheels as one wheel.

Further, the invention can also be applied to a vehicle in which the left and right wheels are connected by a differential gear. In this case, the control has only to be carried out by combining a brake for the driving wheel so that the driving forces of the left and right wheels can be adjusted independently. Also, the control may be carried out so that the slip of a wheel having a larger slip amount of the left and right wheels is eliminated.

Also, the above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A slip control device for a vehicle with a driving wheel, the device comprising:
a driving source for driving the driving wheel; and
a controller configured to periodically generate a driving force control value for the driving source by multiplying a driving force command value of the driving wheel by a radius of the driving wheel, to calculate a first driving force command value based on a request of a driver, to calculate a second driving force command value based on a current value for the driving force control value and an angular acceleration of the driving wheel, and to change over the driving force command value used to generate the driving force control value from the first driving force command value to the second driving force command value when the driving wheel is in a slip state.

2. The slip control device according to claim 1 wherein the controller is further operable to calculate a slip amount of the driving wheel and to correct the second driving force command value by calculating a correction value of a driving force that converges the slip amount on a target slip amount.

3. The slip control device according to claim 2 wherein the controller is further operable to calculate the correction value Fb of the driving force according to the formula Fb=P×(λ'−λ); wherein λ is the slip amount, λ' is the target slip amount, and P is a gain.

4. The slip control device according to claim 2 wherein the target slip amount λ' is a slip value when a frictional force between the driving wheel and a road surface is a maximum.

5. The slip control device according to claim 2 wherein the controller is further operable to revise the second driving force command value as a value having a lag with respect to the correction value.

6. The slip control device for vehicle according to claim 5, further comprising:
a first threshold value for judging, based on the slip amount, that the driving wheel has become in the slip state; and
a second threshold value, smaller than the first threshold value, for judging, based on the slip amount, that the slip state of the driving wheel has converged.

7. The slip control device according to claim 2 wherein the controller is further operable to revise the second driving force command value as a value having a lag with respect to the correction value when the slip amount of the driving wheel is not smaller than a predetermined threshold value.

8. The slip control device according to claim 1 wherein the controller is further operable to calculate the second driving force command value Ff according to a formula $$Ff = \frac{Tm - Ir \cdot \frac{d\omega}{dt}}{R};$$

wherein Tm is a torque of a motor of the driving source, Ir is an inertia of the driving wheel, R is a radius of the driving wheel, and $d\omega/dt$ is a differential value of a rotational speed $\omega$ of the driving wheel.

9. The slip control device according to claim 1 wherein the controller is further operable to calculate a slip amount $\lambda$ according to a formula $$\lambda = \frac{Vdw - V}{Vdw}$$

when $Vdw \geq V$ and a formula $$\lambda = \frac{Vdw - V}{V}$$

when $Vdw < V$; wherein V is a speed of the vehicle and Vdw is a speed of the driving wheel.

10. The slip control device according to claim 1 wherein the controller is further operable to calculate the first driving force command value using a depression amount of an accelerator pedal, a vehicle speed V and a depression amount of a brake pedal.

11. A slip control device for a vehicle having a driving wheel, comprising:
    driving means for driving the driving wheel of the vehicle;
    driving force control means for periodically generating a driving force control value for driving the driving source by multiplying a driving force command value of the driving wheel by a radius of the driving wheel;
    first driving force command value calculating means for calculating a first driving force command value based on a request of a driver;
    second driving force command value calculating means for calculating a second driving force command value based on a current value for the driving force control value and the angular acceleration of the driving wheel; and
    changeover means for changing over the driving force command value for the driving force control means from the first driving force command value to the second driving force command value when the driving wheel is in a slip state.

12. The slip control device according to claim 11, further comprising:
    slip amount calculating means for calculating a slip amount of the driving wheel.

13. The slip control device according to claim 12, further comprising:
    correction means for correcting the second driving force command value by calculating a correction value of a driving force that converges the slip amount on a target slip amount.

14. The slip control device according to claim 13, further comprising:
    delaying means for adding the second driving force command value as a value having a lag with respect to the correction value.

15. The slip control device according to claim 11 wherein the changeover means further comprises:
    means for judging that the driving wheel has become in a slip state using a first threshold value and a slip amount; and
    means for judging that the slip state of the driving wheel has converged using a second threshold value, smaller than the first threshold value, and the slip amount.

16. A method of controlling slip in a slip control device for vehicle including a driving wheel and a driving source for the driving wheel, the method comprising:
    periodically generating a driving force control value to drive the driving source by multiplying a driving force command value of the driving wheel by a radius of the driving wheel;
    calculating a first driving force command value based on a request of a driver;
    calculating a second driving force command value based on a current value for the driving force control value and an angular acceleration of the driving wheel; and
    changing over the driving force command value from the first driving force command value to the second driving force command value when the driving wheel is in a slip state.

17. The method of controlling slip according to claim 16, further comprising:
    calculating a slip amount of the driving wheel;
    calculating a correction value of a driving force that converges the slip amount on a target slip amount; and
    correcting the second driving force command value using the correction value.

18. The method of controlling slip according to claim 16, further comprising:
    subjecting the second driving force command value to first-order lag filtering.

19. The method of controlling slip according to claim 16, further comprising:
    calculating a slip amount of the driving wheel;
    judging that the driving wheel has become in the slip state based on the slip amount and a first threshold value; and
    judging that the slip state of the driving wheel has converged based on the slip amount and a second threshold value smaller than the first threshold value.

20. The method of controlling slip according to claim 16 wherein calculating the second driving force command value further comprises calculating the second driving force command value according to a formula $$Ff = \frac{Tm - Ir \cdot \frac{d\omega}{dt}}{R};$$

wherein Tm is a torque of a motor of the driving source, Ir is an inertia of the driving wheel, R is a radius of the driving wheel, and $d\omega/dt$ is a differential value of a rotational speed $\omega$ of the driving wheel.

* * * * *